US008842426B2

(12) United States Patent
Chou

(10) Patent No.: US 8,842,426 B2
(45) Date of Patent: Sep. 23, 2014

(54) ADJUSTABLE BUFFER AND MULTI-MEDIA STORAGE DEVICE MODULE USING THE SAME

(75) Inventor: Chien-Tsai Chou, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 429 days.

(21) Appl. No.: 13/344,571

(22) Filed: Jan. 5, 2012

(65) Prior Publication Data
US 2012/0182684 A1   Jul. 19, 2012

(30) Foreign Application Priority Data

Jan. 18, 2011  (TW) .............................. 100101826 A

(51) Int. Cl.
| | | |
|---|---|---|
| G06F 1/16 | (2006.01) | |
| H05K 5/00 | (2006.01) | |
| H05K 7/00 | (2006.01) | |
| G11B 33/08 | (2006.01) | |
| G11B 33/12 | (2006.01) | |
| G06F 1/18 | (2006.01) | |

(52) U.S. Cl.
CPC ................ G06F 1/181 (2013.01); G11B 33/08 (2013.01); G11B 33/124 (2013.01)
USPC ........................ 361/679.33; 292/348; 248/635

(58) Field of Classification Search
USPC .................................................. 361/679.33
See application file for complete search history.

(56) References Cited

U.S. PATENT DOCUMENTS

| | | | | |
|---|---|---|---|---|
| 2,903,208 | A * | 9/1959 | Everitt ....................... | 267/141.2 |
| 3,957,127 | A * | 5/1976 | Bouchard et al. ............. | 248/599 |
| 4,713,714 | A * | 12/1987 | Gatti et al. .................... | 360/137 |
| 4,858,880 | A * | 8/1989 | Durand ......................... | 248/635 |
| 4,979,062 | A * | 12/1990 | Stefansky et al. .......... | 360/97.13 |
| 5,535,092 | A * | 7/1996 | Bang ......................... | 361/679.34 |
| 6,029,942 | A * | 2/2000 | Daddis et al. ................ | 248/635 |
| 6,138,980 | A * | 10/2000 | Farbotnik ...................... | 248/638 |
| 6,435,793 | B1 * | 8/2002 | Dobson ......................... | 411/533 |
| 7,237,246 | B2 * | 6/2007 | Chang ........................... | 720/692 |

(Continued)

FOREIGN PATENT DOCUMENTS

| | | |
|---|---|---|
| TW | 558031 | 10/2003 |
| TW | M296456 | 8/2006 |

(Continued)

*Primary Examiner* — Bradley Thomas
*Assistant Examiner* — Theron Milliser
(74) *Attorney, Agent, or Firm* — Jianq Chyun IP Office

(57) ABSTRACT

An adjustable buffer and a multi-media storage device module are provided. The module includes a multi-media storage device, multiple adjustable buffers and multiple fasteners. Each buffer including a supporting unit, a body having a second assembling portion pivoted to the first assembling portion and multiple extension units, a cover having an opening and multiple second locking structures and a fixing cap is installed at two opposite sidewalls of the device. The supporting unit has a main portion, a first assembling portion and multiple first locking structures disposed at the body surrounding the first assembling portion. The second locking structures pass through the body to lock the first locking structures and the first assembling portion in the opening contacts the extension units. The cap is assembled to the first assembling portion and presses the second assembling portion. The fasteners pass through the first assembling portion and are screwed into the device.

17 Claims, 7 Drawing Sheets

(56) References Cited

U.S. PATENT DOCUMENTS

| | | | |
|---|---|---|---|
| 7,507,924 B2 * | 3/2009 | Lorenzo Riera et al. | 200/314 |
| 7,839,639 B2 * | 11/2010 | Najbert | 361/695 |
| 7,954,784 B2 * | 6/2011 | Yeh et al. | 248/635 |
| 8,137,041 B2 * | 3/2012 | Zhou | 411/353 |
| 8,474,804 B2 * | 7/2013 | Masterson et al. | 267/141 |
| 8,593,803 B2 * | 11/2013 | Guo et al. | 361/679.39 |
| 2002/0051338 A1 * | 5/2002 | Jiang et al. | 361/685 |
| 2004/0113339 A1 * | 6/2004 | Masterson et al. | 267/153 |
| 2007/0165373 A1 * | 7/2007 | Merz et al. | 361/685 |
| 2007/0183864 A1 * | 8/2007 | Shishikura | 411/323 |
| 2011/0228451 A1 * | 9/2011 | Chiu | 361/679.01 |

FOREIGN PATENT DOCUMENTS

| | | |
|---|---|---|
| TW | 200945326 | 11/2009 |
| TW | M368877 | 11/2009 |
| TW | M370156 | 12/2009 |

\* cited by examiner

ADJUSTABLE BUFFER AND MULTI-MEDIA STORAGE DEVICE MODULE USING THE SAME

CROSS-REFERENCE TO RELATED APPLICATION

This application claims the priority benefit of Taiwan application serial no. 100101826, filed on Jan. 18, 2011. The entirety of the above-mentioned patent application is hereby incorporated by reference herein and made a part of this specification.

BACKGROUND OF THE INVENTION

1. Field of the Invention

The invention generally relates to an adjustable buffer and a multi-media storage device module, and more particularly, to an adjustable buffer applicable to multi-media storage devices with various specifications and a multi-media storage device module using the adjustable buffer.

2. Description of Related Art

It is well known that a multi-media storage device easily gets damaged due to collision or shock, and in order to protect the multi-media storage device and lengthen the lifetime thereof, usually a plurality of anti-shocked rubbers are disposed outside the multi-media storage device so as to absorb the external impact. FIG. 1 is a cross-sectional diagram of a conventional multi-media storage device module. Referring to FIG. 1, a conventional multi-media storage device module 100 includes a multi-media storage device 102, a case 104 and a plurality of rubbers 106. For reducing an external impact action on the multi-media storage device 102, the rubbers 106 are disposed between the multi-media storage device 102 and the case 104, so that as the multi-media storage device module 100 suffers collisions, the shock would be transmitted into the multi-media storage device 102 via the case 104, wherein the rubbers 106 located between the multi-media storage device 102 and the case 104 can provide an effect of buffering the shock.

However, since the multi-media storage device 102 would have various specifications suitable for different models of applied electronic apparatuses (for example, the rail of the case 104 to facilitate assembling the multi-media storage device 102), the specification of the rubber 106 needs to be accordingly modified to suit the spaces of different electronic apparatuses for accommodating the multi-media storage device 102, and different capacities, figures or sizes of the multi-media storage device 102, which are unable to effectively reduce the cost.

SUMMARY OF THE INVENTION

Accordingly, the invention is directed to an adjustable buffer applicable to multi-media storage devices with various specifications.

The invention is also directed to a multi-media storage device module capable of protecting a multi-media storage device.

The invention provides an adjustable buffer, which includes a supporting unit, a body, a cover and a fixing cap. The supporting unit has a main portion, a first assembling portion and a plurality of first locking structures, wherein an axis direction of the first assembling portion is parallel to a normal direction of the main portion, and the first locking structures are disposed at the main portion surrounding the first assembling portion and extend from the main portion towards the normal direction relatively far away from the main portion. The body has a second assembling portion and a plurality of extension units disposed surrounding the second assembling portion, wherein the second assembling portion is pivoted to the first assembling portion, each of the extension units has a joining portion and an elastic body, and the elastic body is connected to the end of the joining portion relatively far away from the second assembling portion. The cover has an opening and a plurality of second locking structures disposed correspondingly to the first locking structures, wherein the second locking structures pass through the body to lock the first locking structures of the supporting unit, and the first assembling portion of the supporting unit is located in the opening and contacts the extension units. The fixing cap is assembled to the first assembling portion and presses the second assembling portion of the body, wherein when the distance of the fixing cap at the first assembling portion relative to the main portion is changed, the relative distance between the elastic bodies of the extension units and the supporting unit is also changed.

In an embodiment of the adjustable buffer of the present invention, the above-mentioned main portion of the supporting unit is in a circle shape.

In an embodiment of the adjustable buffer of the present invention, the above-mentioned supporting unit further has a baffle wall disposed surrounding the edge of the main portion, and the first locking structures are located between the first assembling portion and the baffle wall.

In an embodiment of the adjustable buffer of the present invention, the above-mentioned first assembling portion of the supporting unit has external thread and the fixing cap has internal thread.

In an embodiment of the adjustable buffer of the present invention, the above-mentioned second assembling portion of the body is in a ring shape.

In an embodiment of the adjustable buffer of the present invention, the above-mentioned first assembling portion is selected from one of a hook and a ring, and the second assembling portion is selected as the other one of the hook and the ring.

In an embodiment of the adjustable buffer of the present invention, the above-mentioned cover and fixing cap are in a ring shape.

In an embodiment of the adjustable buffer of the present invention, the above-mentioned fixing cap further has a pair of holding portions disposed at a surface of the fixing cap relatively far away from the main portion.

The invention also provides a multi-media storage device module, which includes a multi-media storage device, a plurality of above-mentioned adjustable buffers and a plurality of fasteners, wherein the multi-media storage device has two opposite sidewalls and the adjustable buffers are disposed at opposite sidewalls of the multi-media storage device. The fasteners pass through the first assembling portions of the supporting units of the adjustable buffers and are screwed into the multi-media storage device.

In an embodiment of the multi-media storage device of the present invention, the above-mentioned fasteners are screws.

Based on the depiction above, the adjustable buffers of the invention can be installed at multi-media storage devices with various specifications without additional die-making design against different specifications of a multi-media storage device. By using the adjustable buffers, the multi-media storage device module is advantageous in effectively reducing the cost thereof.

In order to make the aforementioned and other features and advantages of the invention comprehensible, several exemplary embodiments accompanied with figures are described in detail below.

DESCRIPTION OF THE EMBODIMENTS

Figure 1:
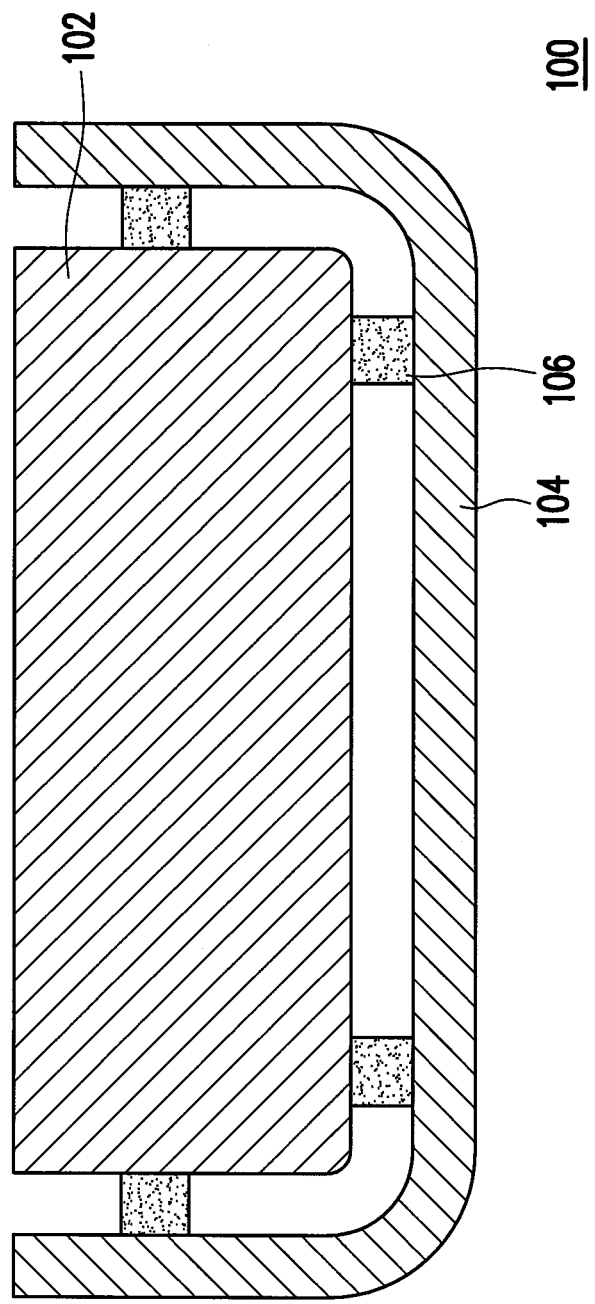
FIG. 1 is a cross-sectional diagram of a conventional multi-media storage device module.

Reference will now be made in detail to the preferred embodiments of the invention, examples of which are illustrated in the accompanying drawings. Wherever possible, the same reference numbers are used in the drawings and the description to refer to the same or like parts.

The adjustable buffer of the invention is adjustable to suit multi-media storage devices with various specifications, so that only one die to fabricate the adjustable buffers is required, and the cost can be further saved.

Figure 2:
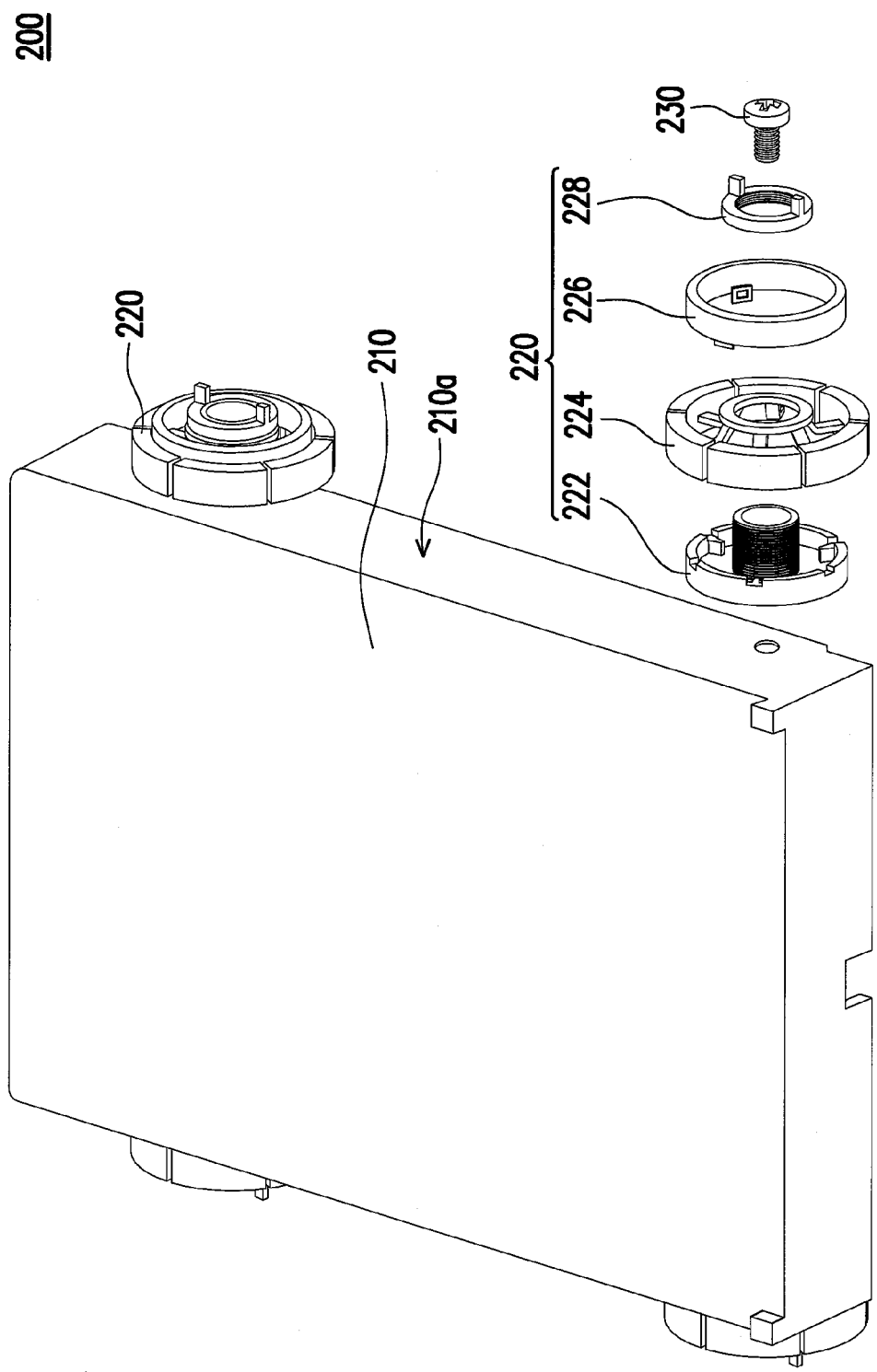
FIG. 2 is a diagram of a multi-media storage device module according to an embodiment of the invention.

FIG. 2 is a diagram of a multi-media storage device module according to an embodiment of the invention. Referring to FIG. 2, a multi-media storage device module 200 includes a multi-media storage device 210, a plurality of adjustable buffers 220 and a plurality of fasteners 230. The multi-media storage device 210 herein has opposite sidewalls 210a, and the fasteners 230 pass through the adjustable buffers 220 to be screwed into the multi-media storage device 210 for fixing the adjustable buffers 220 at the opposite sidewalls 210a of the multi-media storage device 210.

Figure 3:
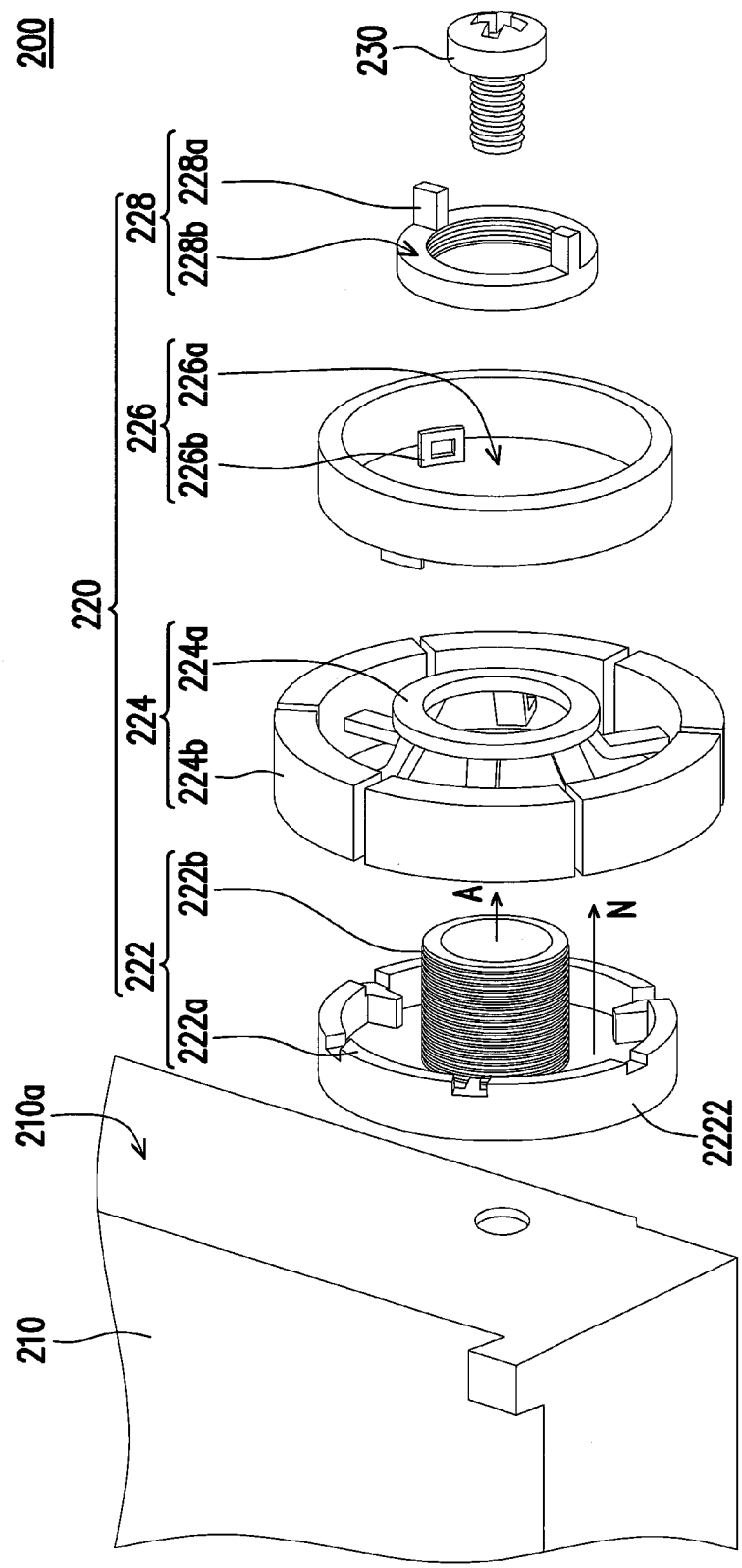
FIG. 3 is a locally enlarged diagram of FIG. 2.
Figure 4:
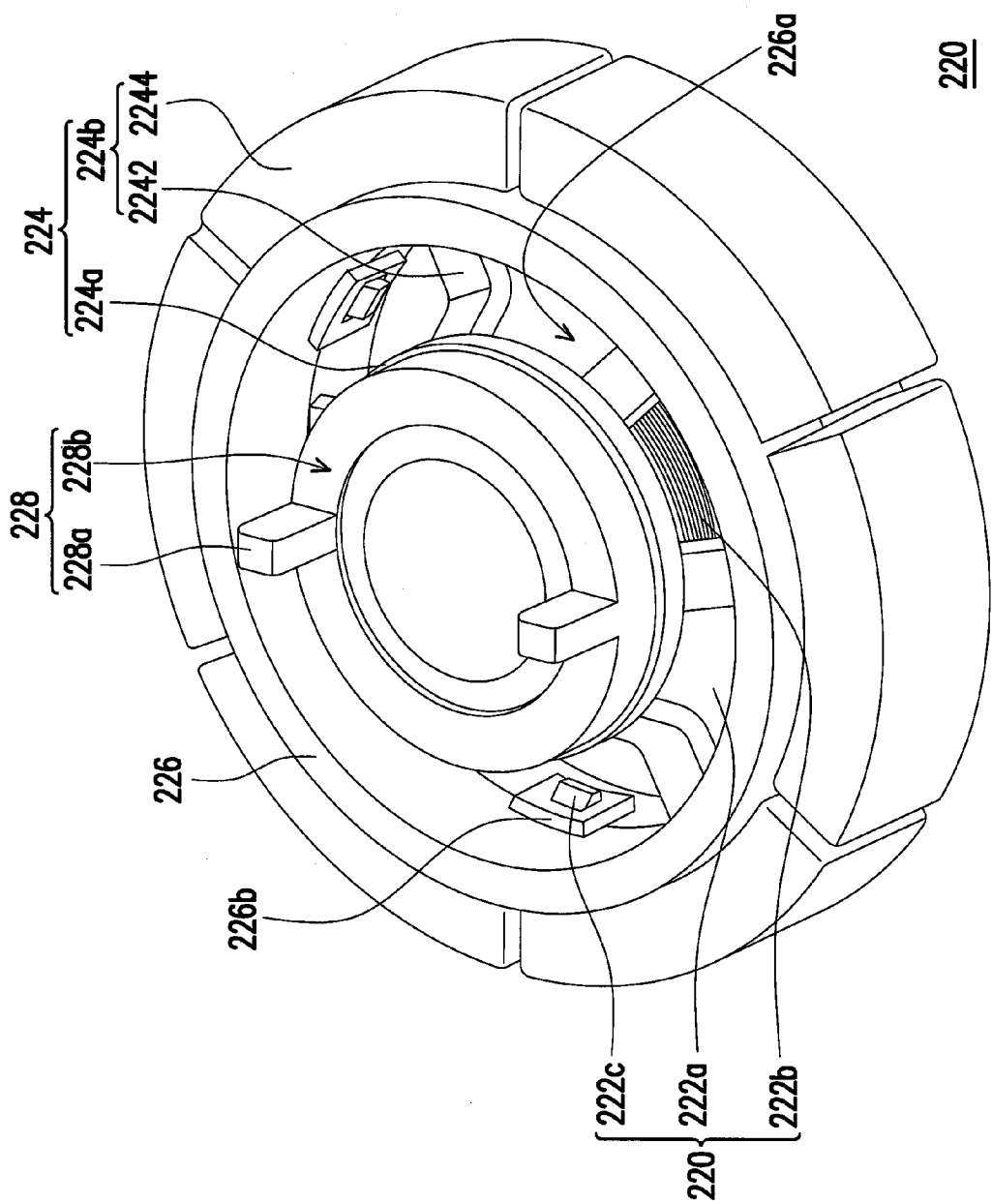
FIG. 4 is a three-dimensional diagram of the adjustable buffer of FIG. 3.
Figure 5:
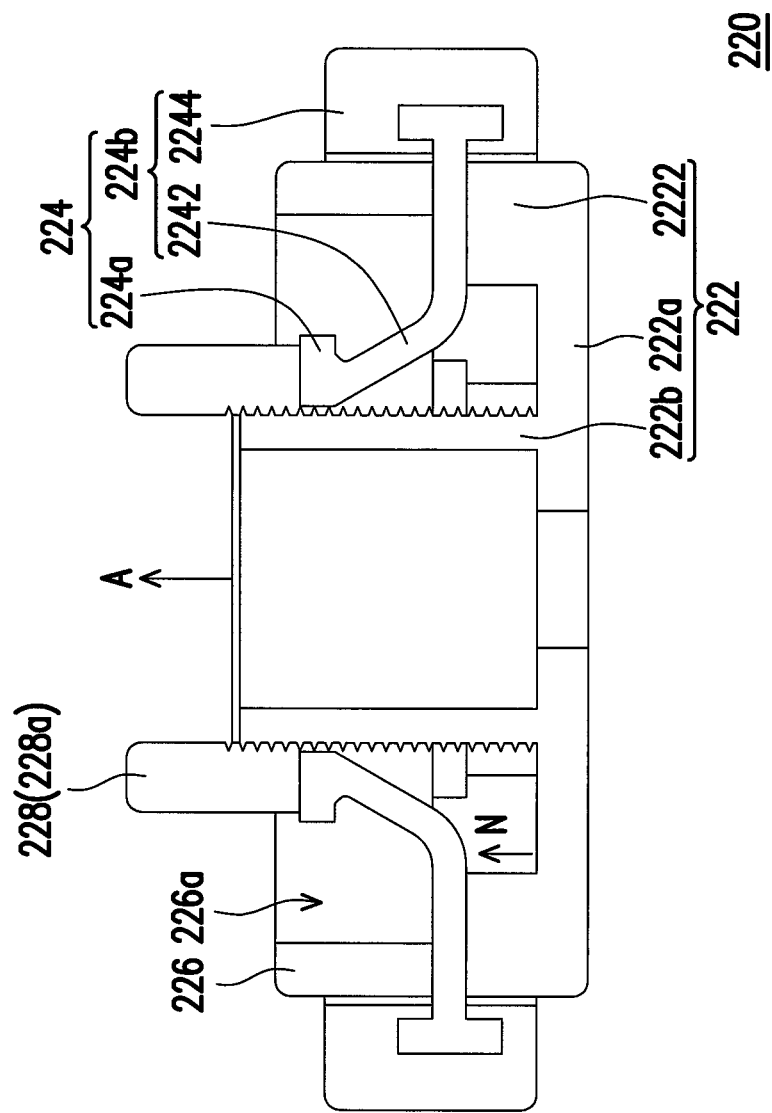
FIG. 5 is a cross-sectional diagram of the adjustable buffer of FIG. 4.

FIG. 3 is a locally enlarged diagram of FIG. 2, FIG. 4 is a three-dimensional diagram of the adjustable buffer of FIG. 3 and FIG. 5 is a cross-sectional diagram of the adjustable buffer of FIG. 4. Referring to FIGS. 3, 4 and 5, each of the adjustable buffers 220 includes a supporting unit 222, a body 224, a cover 226 and a fixing cap 228. The supporting unit 222 has a main portion 222a, a first assembling portion 222b and a plurality of first locking structures 222c, wherein an axis direction A of the first assembling portion 222b is parallel to a normal direction N of the main portion 222a. The first locking structures 222c are disposed at the main portion 222a surrounding the first assembling portion 222b and extend from the main portion 222a towards the normal direction N relatively far away from the main portion 222a. The body 224 has a second assembling portion 224a and a plurality of extension units 224b disposed surrounding the second assembling portion 224a, wherein the second assembling portion 224a is pivoted to the first assembling portion 222b, each of the extension units 224b has a joining portion 2242 and an elastic body 2244, and the elastic body 2244 is connected to the end of the joining portion 2242 relatively far away from the second assembling portion 224a. The cover 226 has an opening 226a and a plurality of second locking structures 226b disposed correspondingly to the first locking structures 222c, wherein the second locking structures 226b pass through the body 224 to lock the first locking structures 222c of the supporting unit 222. The first assembling portion 222b of the supporting unit 222 is located in the opening 226a and contacts the extension units 224b. The fixing cap 228 is assembled to the first assembling portion 222b and presses the second assembling portion 224a of the body 224. The fasteners 230 pass through the first assembling portions 222b of the supporting units 222 of the adjustable buffers 220 and are screwed into the multi-media storage device 210, wherein the fasteners 230 of the embodiment are screws.

In the embodiment, the first assembling portion 222b is hook and the second assembling portion 224a is ring, but the shapes of the first assembling portion 222b and the second assembling portion 224a can be changed according to the practice. As long as the first assembling portion 222b and the second assembling portion 224a can be locked by each other or connected together, and the cover 226 and the supporting unit 222 are relatively fixed.

The main portion 222a of the supporting unit 222 in the embodiment is in a circle plate shape, and the supporting unit 222 can further have a baffle wall 2222 disposed surrounding the edge of the main portion 222a. The first locking structures 222c are located between the first assembling portion 222b and the baffle wall 2222, wherein when the cover 226 is fixed relatively to the supporting unit 222, the cover 226 is supported on the baffle wall 2222. In addition, the second assembling portion 224a of the body 224 is in a ring shape, and the cover 226 and the fixing cap 228 are in a ring shape as well. In order to facilitate assembling the fixing cap 228 to the first assembling portion 222b of the supporting unit 222, the first assembling portion 222b has external thread and the fixing cap 228 has internal thread, and the assembling worker can use the match of the internal thread and the external thread to conveniently assemble the fixing cap 228 to the first assembling portion 222b of the supporting unit 222. The fixing cap 228 further has a pair of holding portions 228a, which are disposed at a surface of the fixing cap 228 relatively far away from the main portion 222a.

The extension units 224b of the embodiment are fabricated by utilizing bi-materials injection moulding process. In more details, the joining portion 2242 of each extension unit 224b is made of plastic having which is relatively hard and capable of being elongated, while the elastic body 2244 is made of rubber which is relatively soft and able to reduce the impact force. By utilizing bi-materials injection moulding process to fabricate the extension units 224b, the labor costs and the labor hours for assembling the elastic bodies 2244 to the joining portions 2242 are saved.

Referring to FIGS. 2, 4 and 5, during assembling the adjustable buffers 220 of the embodiment, first, the first assembling portion 222b of the supporting unit 222 passes through the second assembling portion 224a of the body 224 and then, the second locking structures 226b of the cover 226 pass through the body 224 so as to lock the first locking structures 222c of the supporting unit 222 together. To be specific, each of the extension units 224b is separated from the adjacent extension units 224b, which means an individual elastic body 2244 is connected to an individual joining portion 2242 and the elastic bodies 2244 are not connected to each other. In this way, when the elastic body 2244 has a tire shape, it is avoided the structure property of the elastic body 2244 in a tire shape itself might limit the elongation length of the joining portion 2242.

Figure 6:
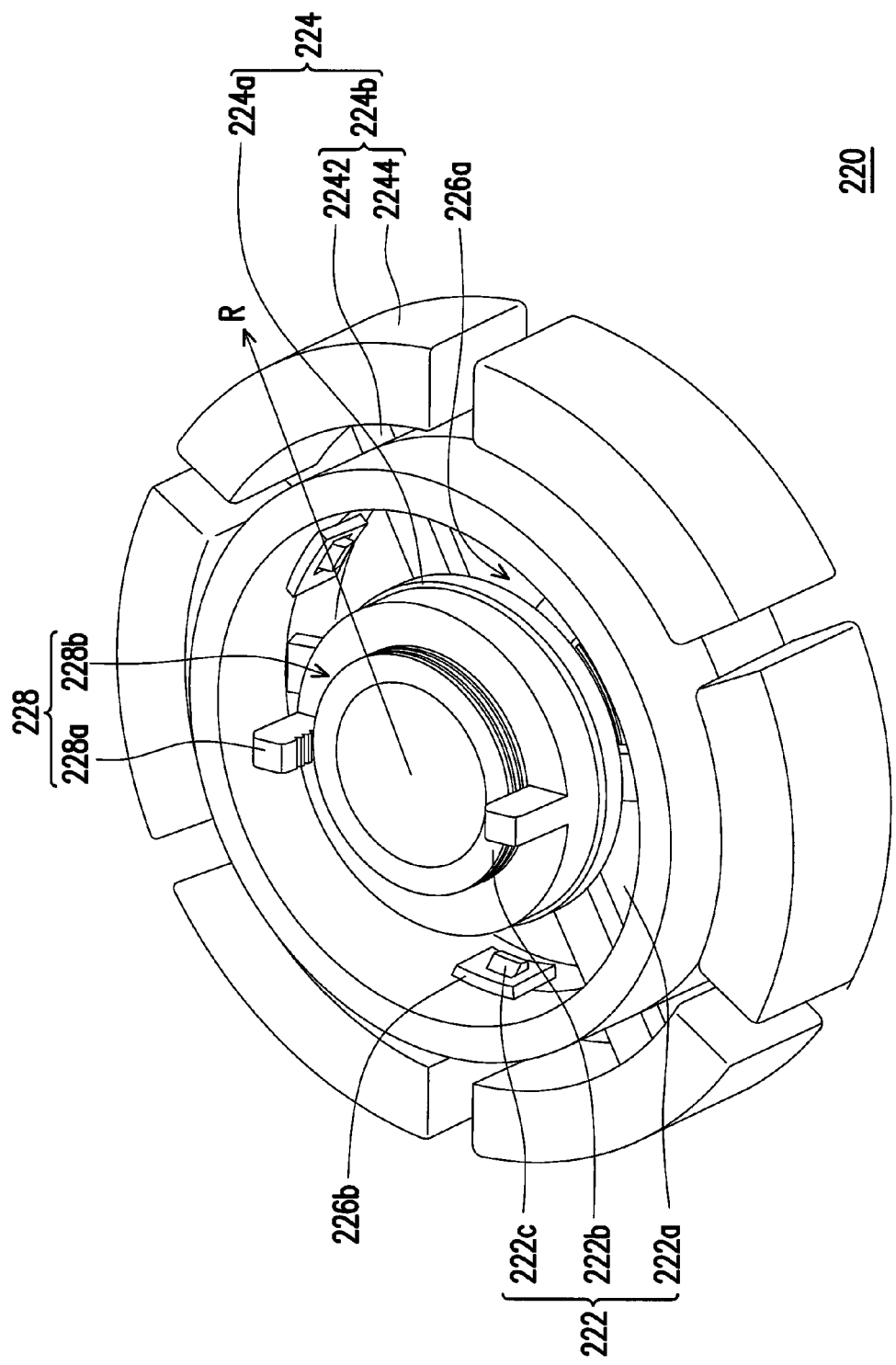
FIG. 6 is a three-dimensional diagram of the adjustable buffer which is open up of FIG. 4.
Figure 7:
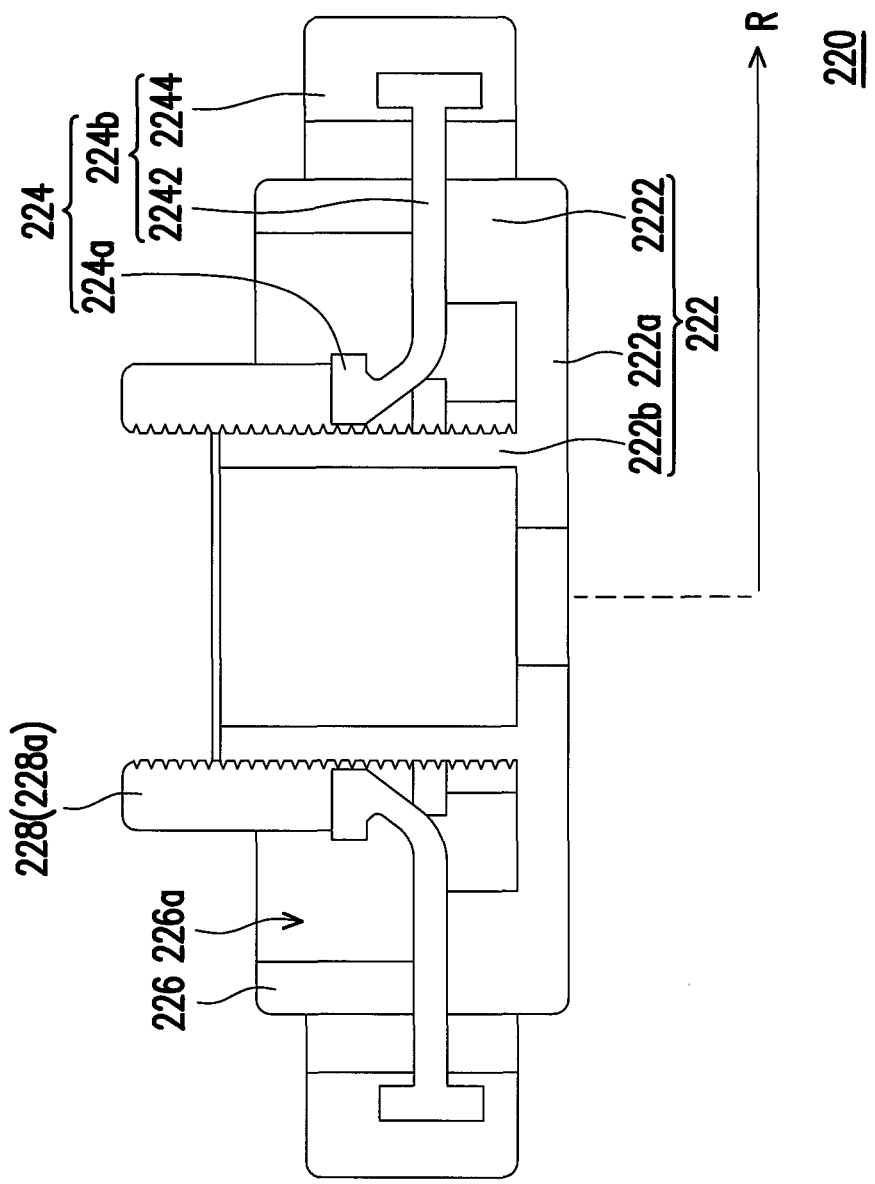
FIG. 7 is a cross-dimensional diagram of the adjustable buffer of FIG. 5.

FIG. 6 is a three-dimensional diagram of the adjustable buffer which is open up of FIG. 4 and FIG. 7 is a cross-dimensional diagram of the adjustable buffer of FIG. 5. Referring to FIGS. 4, 5 and 6, to suit multi-media storage devices 210 with various specifications, an assembling worker can change the distance of the fixing cap 228 at the first assembling portion 222b relative to the main portion 222a so as to change the relative distance between the elastic body 2244 of each the extension unit 224b and the second assembling portion 224a (at the time, the adjustable buffer 220 looks like being open up), so that the distance conforms with the specification required by the adjustable buffer 220 of the multi-media storage device 210. After that, referring to FIGS. 5, 6 and 7, in more details, the assembling worker can hold the holding portions 228a by two fingers, followed by applying a force to the holding portions 228a so that the fixing cap 228 turns through the internal thread thereof relatively to the external thread of the first assembling portion 222b of the supporting unit 222. In this way, the fixing cap 228 at the first assembling portion 222b moves by adjustment towards the direction relatively closer to the main portion 222a. At the time, the body 224 is pressed by the fixing cap 228, and the joining portions 2242 get deformed by the force and are elongated on the radial direction R of the body 224, which further brings the elastic bodies 2244 moving relatively far away from the supporting unit 222 and the overall area of the adjustable buffer 220 on the radial direction R is significantly increased.

On contrary, in order to reduce the overall area of the adjustable buffer 220 on the radial direction R, the fixing cap 228 at the first assembling portion 222b needs to move towards the direction relatively far away from the main portion 222a by turning, which reduces the pressing force applied by the fixing cap 228 to the body 224, the elastic bodies 2244 move towards the direction relatively closer to the supporting unit 222 through the elastic resuming forces of the joining portions 2242 and the overall area of the adjustable buffer 220 on the radial direction R is significantly reduced.

By adjusting the overall area of the adjustable buffer 220 on the radial direction R, the adjustable buffer 220 can change the specification thereof corresponding to different rails of electronic apparatuses, hence, the multi-media storage device module 200 using the adjustable buffers 220 is advantageous in broad applicable specifications.

Although in the above-mentioned embodiment, the main portion 222a of the supporting unit 222 is in a circle shape and all the second assembling portion 224a, the cover 226 and the fixing cap 228 are in a ring shape, but they are examples for explanation only, and anyone skilled in the art can change the shapes of the elements without infringing the spirit of the invention. For example, the main portion 222a of the supporting unit 222 can be in a square shape and all the second assembling portion 224a, the cover 226 and the fixing cap 228 can be in a square frame shape.

In summary, the adjustable buffer of the invention is advantageous in changing the specification thereof correspondingly to different rails of electronic apparatuses, so that there is no need to additionally make dies for fabricating the adjustable buffer with various specifications, which further effectively saves the cost. In addition, the multi-media storage device module using the adjustable buffer has also the advantage of broad applicable specifications. Moreover, the extension units are fabricated by utilizing bi-materials injection moulding process, which can save the labor and the labor hours for assembling the elastic bodies to the joining portions.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An adjustable buffer, comprising:
    a supporting unit, having a main portion, a first assembling portion and a plurality of first locking structures, wherein an axis direction of the first assembling portion is parallel to a normal direction of the main portion, and the first locking structures are disposed at the main portion surrounding the first assembling portion and extend from the main portion towards the normal direction relatively far away from the main portion;
    a body, having a second assembling portion and a plurality of extension units disposed surrounding the second assembling portion, wherein the second assembling portion is pivoted to the first assembling portion, each of the extension units has a joining portion and an elastic body, and the elastic body is connected to the end of the joining portion relatively far away from the second assembling portion;
    a cover, having an opening and a plurality of second locking structures disposed correspondingly to the first locking structures, wherein the second locking structures pass through the body to lock the first locking structures of the supporting unit, and the first assembling portion of the supporting unit is located in the opening and contacts the extension units; and
    a fixing cap, assembled to the first assembling portion and pressing the second assembling portion of the body, wherein when the distance of the fixing cap at the first assembling portion relative to the main portion is changed, the relative distance between the elastic bodies of the extension units and the supporting unit is also changed.

2. The adjustable buffer as claimed in claim 1, wherein the main portion of the supporting unit is in a circle shape.

3. The adjustable buffer as claimed in claim 1, wherein the supporting unit further has a baffle wall disposed surrounding the edge of the main portion, and the first locking structures are located between the first assembling portion and the baffle wall.

4. The adjustable buffer as claimed in claim 1, wherein the first assembling portion of the supporting unit has an external thread and the fixing cap has an internal thread.

5. The adjustable buffer as claimed in claim 1, wherein the second assembling portion of the body is in a ring shape.

6. The adjustable buffer as claimed in claim 1, wherein the first assembling portion is selected from one of a hook and a ring, and the second assembling portion is selected as the other one of the hook and the ring.

7. The adjustable buffer as claimed in claim 1, wherein the cover and the fixing cap are in a ring shape.

8. The adjustable buffer as claimed in claim 1, wherein the fixing cap further has a pair of holding portions disposed at a surface of the fixing cap relatively far away from the main portion.

9. A multi-media storage device module, comprising:
    a multi-media storage device, having two opposite sidewalls;
    a plurality of adjustable buffers, installed at opposite sidewalls of the multi-media storage device, wherein each of the adjustable buffers comprises:
        a supporting unit, disposed at the multi-media storage device and having a main portion, a first assembling portion and a plurality of first locking structures, wherein an axis direction of the first assembling portion is parallel to a normal direction of the main portion, and the first locking structures are disposed at the main portion surrounding the first assembling portion and extend from the main portion towards the noi mai direction relatively far away from the main portion;

a body, having a second assembling portion and a plurality of extension units disposed surrounding the second assembling portion, wherein the second assembling portion is pivoted to the first assembling portion, each of the extension units has a joining portion and an elastic body, and the elastic body is connected to the end of the joining portion relatively far away from the second assembling portion;

a cover, having an opening and a plurality of second locking structures disposed correspondingly to the first locking structures, wherein the second locking structures pass through the body to lock the first locking structures of the supporting unit, and the first assembling portion of the supporting unit is located in the opening and contacts the extension units;

a fixing cap, assembled to the first assembling portion and pressing the second assembling portion of the body; and a plurality of fasteners, passing through the first assembling portions of the supporting units of the adjustable buffers and screwed into the multi-media storage device, wherein when the distance of the fixing cap at the first assembling portion relative to the main portion is changed, the relative distance between the elastic bodies of the extension units and the supporting unit is also changed.

10. The multi-media storage device module as claimed in claim 9, wherein the main portion of the supporting unit is in a circle shape.

11. The multi-media storage device module as claimed in claim 9, wherein the supporting unit of the adjustable buffer further has a baffle wall disposed surrounding the edge of the main portion, and the first locking structures are located between the first assembling portion and the baffle wall.

12. The multi-media storage device module as claimed in claim 9, wherein the first assembling portion of the supporting unit of the adjustable buffer has an external thread and the fixing cap has an internal thread.

13. The multi-media storage device module as claimed in claim 9, wherein the second assembling portion of the body of the adjustable buffer is in a ring shape.

14. The multi-media storage device module as claimed in claim 9, wherein the first assembling portions are selected from one kind of hooks and rings, and the second assembling portions are selected as the other kind of hooks and rings.

15. The multi-media storage device module as claimed in claim 9, wherein the cover of the adjustable buffer and the fixing cap are in a ring shape.

16. The multi-media storage device module as claimed in claim 9, wherein the fixing cap of the adjustable buffer further has a pair of holding portions disposed at a surface of the fixing cap relatively far away from the main portion.

17. The multi-media storage device module as claimed in claim 9, wherein the fasteners are screws.

\* \* \* \* \*